US009604311B2

(12) United States Patent
Evangelista et al.

(10) Patent No.: US 9,604,311 B2
(45) Date of Patent: Mar. 28, 2017

(54) WELDED BLANK ASSEMBLY AND METHOD

(71) Applicant: Shiloh Industries, Inc., Valley City, OH (US)

(72) Inventors: James J. Evangelista, Northville, MI (US); Michael Telenko, Jr., Canton, MI (US); Jason E. Harfoot, Walled Lake, MI (US); Jack A. Atkinson, Brunswick, OH (US); James W. Walther, Litchfield, OH (US); Anthony M. Parente, Valley City, OH (US)

(73) Assignee: Shiloh Industries, Inc., Valley City, OH (US)

( * ) Notice: Subject to any disclaimer, the term of this patent is extended or adjusted under 35 U.S.C. 154(b) by 889 days.

(21) Appl. No.: 13/930,916

(22) Filed: Jun. 28, 2013

(65) Prior Publication Data

US 2014/0003860 A1 Jan. 2, 2014

Related U.S. Application Data

(60) Provisional application No. 61/666,388, filed on Jun. 29, 2012, provisional application No. 61/701,909, (Continued)

(51) Int. Cl.
*B23K 26/32* (2014.01)
*B23K 9/235* (2006.01)
(Continued)

(52) U.S. Cl.
CPC .......... *B23K 26/3293* (2013.01); *B23K 9/235* (2013.01); *B23K 26/322* (2013.01);
(Continued)

(58) Field of Classification Search
CPC ........ B23K 1/0056; B23K 9/02; B23K 11/08; B23K 15/0053; B23K 15/0073;
(Continued)

(56) References Cited

U.S. PATENT DOCUMENTS 2,177,868 A 10/1939 Chapman
2,815,436 A * 12/1957 Bland ...................... B23K 9/23
219/118

(Continued)

FOREIGN PATENT DOCUMENTS

CN 1633333 A 6/2005
CN 101128278 A 2/2008
(Continued)

OTHER PUBLICATIONS

Written Opinion & International Search Report for PCT/US13/048618, Sep. 25, 2013, 15 pages.

(Continued)

*Primary Examiner* — Michael P Ferguson
(74) *Attorney, Agent, or Firm* — Reising Ethington, P.C.

(57) ABSTRACT

A welded blank assembly is formed by welding edge regions of separate sheet metal pieces together at a weld joint. One or more of the sheet metal pieces includes a coating material layer and a weld notch, where at least some of the coating material layer is removed from the edge region(s) prior to welding so that the weld joint is substantially free from constituents of the coating material layer. An additional material may be added to a weld pool during weld joint formation to influence the size, shape and/or composition of the resulting weld joint to help compensate for the presence of the weld notch.

23 Claims, 5 Drawing Sheets

Related U.S. Application Data filed on Sep. 17, 2012, provisional application No. 61/731,497, filed on Nov. 30, 2012, provisional application No. 61/784,184, filed on Mar. 14, 2013.

(51) Int. Cl.
  *B23K 26/322* (2014.01)
  *B23K 26/60* (2014.01)
  *B23K 101/34* (2006.01)

(52) U.S. Cl.
  CPC .......... *B23K 26/60* (2015.10); *B23K 2201/34* (2013.01); *Y10T 403/477* (2015.01)

(58) Field of Classification Search
  CPC .. B23K 15/0093; B23K 26/211; B23K 26/24; B23K 26/32; B23K 26/322; B23K 33/004
  See application file for complete search history.

(56) References Cited

U.S. PATENT DOCUMENTS

| | | |
|---|---|---|
| 3,464,802 A | 9/1969 | Meyer |
| 3,733,681 A | 5/1973 | Schlein |
| 4,037,073 A | 7/1977 | Becker |
| 4,073,427 A | 2/1978 | Keifert et al. |
| 4,401,727 A | 8/1983 | Berke et al. |
| 4,459,062 A | 7/1984 | Siebert |
| 4,474,861 A | 10/1984 | Ecer |
| 4,642,446 A | 2/1987 | Pennington |
| 4,688,691 A | 8/1987 | Christian |
| 4,725,507 A | 2/1988 | Lescaut |
| 4,758,703 A | 7/1988 | Drever |
| 4,818,629 A | 4/1989 | Jenstrom et al. |
| 4,970,600 A | 11/1990 | Garnier |
| 5,268,556 A | 12/1993 | Coyle, Jr. |
| 5,305,946 A | 4/1994 | Heilmann |
| 5,952,109 A | 9/1999 | Nagami |
| 6,042,659 A | 3/2000 | Brown |
| 6,296,170 B1 | 10/2001 | Hardwick |
| 6,296,805 B1 | 10/2001 | Laurent et al. |
| 6,313,434 B1 | 11/2001 | Patterson |
| 6,407,363 B2 | 6/2002 | Dunsky |
| 6,564,604 B2 | 5/2003 | Kefferstein et al. |
| 6,572,984 B2 | 6/2003 | Brink |
| 6,621,040 B1 | 9/2003 | Perry |
| 6,674,472 B1 | 1/2004 | Tsutsui |
| 6,800,150 B2 | 10/2004 | Totino et al. |
| 7,020,023 B2 | 3/2006 | Kuramori |
| 7,531,283 B2 | 5/2009 | Darcy, III et al. |
| 7,748,598 B2 | 7/2010 | Want |
| 7,971,303 B2 | 7/2011 | Prasad et al. |
| 8,002,169 B2 * | 8/2011 | Miller .................. B23K 31/02 228/165 |
| 8,319,148 B2 | 11/2012 | Nowak |
| 8,614,008 B2 | 12/2013 | Canourgues |
| 8,642,134 B2 | 2/2014 | Nagai |
| 2001/0016268 A1 | 8/2001 | Maki |
| 2001/0042393 A1 | 11/2001 | Kefferstein |
| 2001/0054638 A1 | 12/2001 | Hardwick |
| 2002/0148880 A1 | 10/2002 | Brink |
| 2003/0006221 A1 | 1/2003 | Hong |
| 2003/0201037 A1 | 10/2003 | Totino et al. |
| 2004/0074882 A1 | 4/2004 | Speranza |
| 2004/0247932 A1 | 12/2004 | Kagohara |
| 2005/0136184 A1 | 6/2005 | Voges |
| 2005/0211687 A1 | 9/2005 | Sonoda et al. |
| 2007/0034614 A1 | 2/2007 | McClain |
| 2008/0011720 A1 | 1/2008 | Briand |
| 2008/0092312 A1 | 4/2008 | Prasad |
| 2008/0145688 A1 | 6/2008 | Miller et al. |
| 2008/0257871 A1 | 10/2008 | Leiser |
| 2008/0268279 A1 | 10/2008 | Want |
| 2009/0220815 A1 | 9/2009 | Canourgues et al. |
| 2009/0253809 A1 | 10/2009 | Gomurashvili et al. |
| 2010/0139691 A1 | 6/2010 | Silberberg et al. |
| 2010/0139864 A1 | 6/2010 | Silberberg et al. |
| 2011/0226746 A1 | 9/2011 | Briand |
| 2012/0074106 A1 | 3/2012 | Canourgues |
| 2012/0145686 A1 | 6/2012 | Alpay |
| 2012/0205355 A1 | 8/2012 | Münzer |
| 2013/0236239 A1 | 9/2013 | Brandt |
| 2014/0057128 A1 | 2/2014 | Canourgues |

FOREIGN PATENT DOCUMENTS

| | | |
|---|---|---|
| CN | 101204866 A | 6/2008 |
| CN | 101426612 | 5/2009 |
| CN | 101628355 | 1/2010 |
| CN | 101663717 | 3/2010 |
| DE | 2122926 A1 | 11/1972 |
| DE | 102010019258 | 11/2011 |
| EP | 0971044 | 1/2000 |
| EP | 1143029 | 10/2001 |
| EP | 1878531 | 1/2008 |
| FR | 2827874 | 1/2003 |
| JP | S61159292 A | 7/1986 |
| JP | S62263882 A | 11/1987 |
| JP | H03258484 A | 11/1991 |
| JP | H04237570 A | 8/1992 |
| JP | H06198471 A | 7/1994 |
| JP | H0741841 | 2/1995 |
| JP | 07096380 | 4/1995 |
| JP | H07293749 A | 11/1995 |
| JP | H09501105 A | 2/1997 |
| JP | 9314337 A | 12/1997 |
| JP | H10168545 A | 6/1998 |
| JP | H10176287 A | 6/1998 |
| JP | H11239872 A | 9/1999 |
| JP | 2001252781 A | 9/2001 |
| JP | 2002256407 A | 9/2002 |
| JP | 2003183802 A | 7/2003 |
| JP | 2004223543 A | 8/2004 |
| JP | 2004344919 A | 12/2004 |
| JP | 4200872 | 5/2005 |
| JP | 2007049164 A | 2/2007 |
| JP | 2007154257 A | 6/2007 |
| JP | 2007237216 A | 9/2007 |
| JP | 2009534529 A | 9/2009 |
| JP | 2010052161 A | 3/2010 |
| JP | 2011041982 A | 3/2011 |
| KR | 10198980056004 A | 9/1998 |
| KR | 20040058615 A | 7/2004 |
| KR | 20050103379 A | 10/2005 |
| KR | 20100120584 A | 11/2010 |
| WO | WO2009092760 A1 | 7/2009 |
| WO | WO2011020490 A1 | 2/2011 |

OTHER PUBLICATIONS

Reinhold Braun, Nd:YAG Laser Butt Welding of AA6013 Using Silicon and Magnesium Containing Filler Powders, A 426, Materials Science and Engineering, Jun. 25, 2006.

Vierstraete; Ehling; Pic; Yin, Laser Ablation for Hardening Laser Welded Steel Blanks, Industrial Laser Solutions, Mar. 2010, pp. 6-11.

Tilmann Schmidt-Sandte, Laserstrahlbasierte Entgratverfahren fur Feinwerktechnische Anwendungen, 2003, Fig. 3.8 p. 27 and point 2 p. 32.

Chinese Office Action for Application No. 201380027064.4 dated Sep. 30, 2015, 6 pages.

Korean Office Action for Application No. 10-2015-7002541 dated Dec. 3, 2015, 6 pages.

English Translation of Korean Office Action for Application No. 10-2015-7002541 dated Dec. 3, 2015, 6 pages.

Korean Office Action for Application No. 10-2014-7035822 dated Dec. 3, 2015, 5 pages.

English Translation of Korean Office Action for Application No. 10-2014-7035822 dated Dec. 3, 2015, 6 pages.

Korean Office Action for Application No. 1020157002541 Dated Jul. 26, 2016, 13 pages.

English Translation for Korean Office Action for Application No. 1020157002541 Dated Jul. 26, 2016, 9 pages.

(56) References Cited

OTHER PUBLICATIONS

Japanese Office Action for Application No. 2015514241 Dated Mar. 22, 2016, 5 pages.
English Translation of Japanese Office Action for Application No. 2015514241 Dated Mar. 22, 2016, 6 pages.
Chinese Office Action for Application No. 201380062551.4 Dated Apr. 5, 2016, 11 pages.
Japanese Office Action for Application No. 2015520582 Dated Mar. 29, 2016, 7 pages.
English Translation of Japanese Office Action for Application No. 2015520582 Dated Mar. 29, 2016, 9 pages.
Chinese Office Action for Application No. 201380034771.6 dated May 18, 2016, 10 pages.
Extended European Search Report for Application No. 13808670.7 Dated Jun. 15, 2016, 11 pages.
Extended European Search Report for Application No. 13859144.1 Dated Aug. 4, 2016, 5 pages.

* cited by examiner

WELDED BLANK ASSEMBLY AND METHOD

REFERENCE TO RELATED APPLICATIONS

This application claims the benefit of U.S. Provisional Ser. Nos. 61/666,388 filed on Jun. 29, 2012; 61/701,909 filed on Sep. 17, 2012; 61/731,497 filed on Nov. 30, 2012; and 61/784,184 filed on Mar. 14, 2013, the entire contents of which are incorporated herein by reference.

TECHNICAL FIELD

The present disclosure generally relates to welded blank assemblies and, more particularly, to welding coated sheet metal pieces together to form welded blank assemblies.

BACKGROUND

In an effort to improve resistance to corrosion, scaling and/or other processes, sheet metal made of high-strength or hardenable steel alloys are now being made with one or more thin coating material layers, such as aluminum- and zinc-based layers. Although these coating material layers can impart desirable qualities to the sheet metal, their presence can contaminate welds, thereby reducing weld strength, integrity, etc. This is particularly true if the coated sheet metal piece is being butt welded or lap welded to another sheet metal piece.

SUMMARY

In accordance with one embodiment, a method of making a welded blank assembly, comprising the steps of: (a) providing a first sheet metal piece having a thickness ($t_{T1}$) and a second sheet metal piece having a thickness ($t_{T2}$), at least one of the first and second sheet metal pieces is a coated sheet metal piece and has an edge region with a weld notch where material from a coating material layer has been removed; (b) arranging the first and second sheet metal pieces together at the edge region; and (c) forming a weld joint between the first and second sheet metal pieces at the edge region, wherein the weld joint is at least partially located in the weld notch and includes material from the edge region but is substantially free of material from the coating material layer.

In accordance with another embodiment, there is provided a method of making a welded blank assembly, comprising the steps of: (a) providing first and second sheet metal pieces, at least one of the first and second sheet metal pieces is a coated sheet metal piece and has an edge region with a weld notch where material from a coating material layer has been removed; (b) arranging the first and second sheet metal pieces together at the edge region; (c) using a laser to form a weld pool between the first and second sheet metal pieces at the edge region, the weld pool includes material from the edge region but is substantially free of material from the coating material layer; and (d) providing additional material to the weld pool to influence a size, shape, and/or composition of a weld joint once it is formed, wherein the additional material strengthens the weld joint for a subsequent heat treating process.

In accordance with yet another embodiment, there is provided a welded blank assembly, comprising: a first sheet metal piece having a first weld notch formed in a coating material layer along a first edge region; a second sheet metal piece having a second weld notch formed in a coating material layer along a second edge region; and a weld joint joining the first and second sheet metal pieces together along the first and second edge regions and being substantially free from constituents of the coating material layers of the first and second sheet metal pieces. The weld joint is located within a weld region at least partially defined by surfaces of the first and second weld notches.

DRAWINGS

Preferred exemplary embodiments will hereinafter be described in conjunction with the appended drawings, wherein like designations denote like elements, and wherein:

FIGS. 1A-C are cross-sectional views of a conventional weld joint joining sheet metal pieces that did not have weld notches formed therein before welding;

DETAILED DESCRIPTION

The welded blank assemblies disclosed herein can be made from sheet metal pieces having weld notches located along one or more edges to be welded, where the weld notches are characterized by the absence of certain material constituents so that they do not unacceptably contaminate nearby welds. For instance, a welded blank assembly can be produced from sheet metal pieces with material from one or more coating material layers reduced or removed at a weld notch located along the sheet metal edge. This, in turn, can prevent contamination by the coating material layers of a nearby weld joint formed along the sheet metal edge when making the welded blank assembly and thereby preserve the strength and/or durability of the weld joint in subsequent processes or during its service life.

Figure 1A:
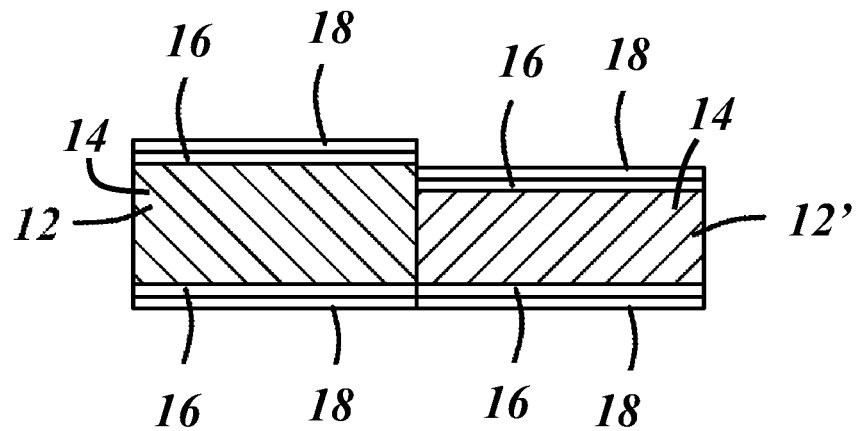
Figure 1B:
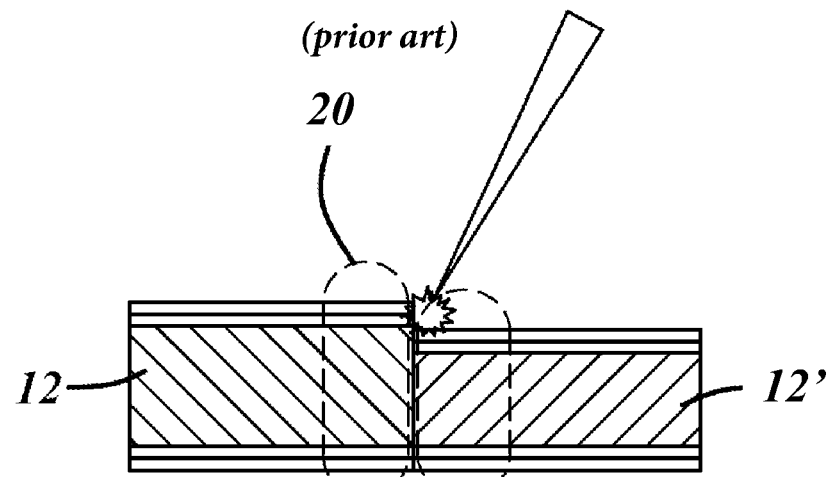
Figure 1C:
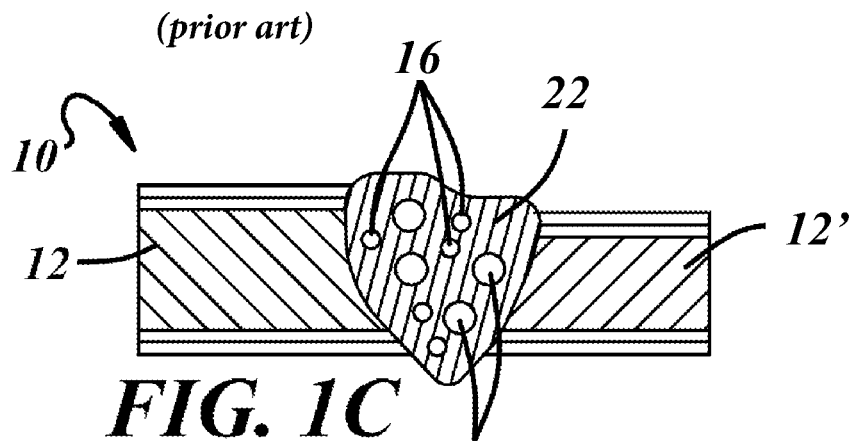

Turning first to FIGS. 1A-C, there are shown some of the steps involved with manufacturing a conventional tailor-welded blank 10 that includes thick and thin sheet metal pieces 12, 12' laser welded together in an edge-to-edge fashion. According to this example, each of the sheet metal pieces 12, 12' has a base material layer 14 and multiple thin material layers 16, 18 covering opposite surfaces of the base material layer. As is appreciated by those skilled in the art, there are numerous material layers that could be found on sheet metal stock, including various types of surface treatments, coating material layers such as aluminum- and zinc-based material layers (e.g., aluminum compounds), oils and other oxidation preventing substances, contaminants from the manufacturing or material handling processes, and oxidation layers, to name but a few. Once the two sheet metal pieces are brought together in abutment, a laser beam or other welding tool is used to melt some of the sheet metal located in edge regions 20, 20' so that a certain amount of the thin material layers 16, 18 becomes embedded within the resulting weld joint 22. Unless first removed, these unwanted constituents could have a negative impact on the overall strength and quality of the weld joint.

Figure 2:
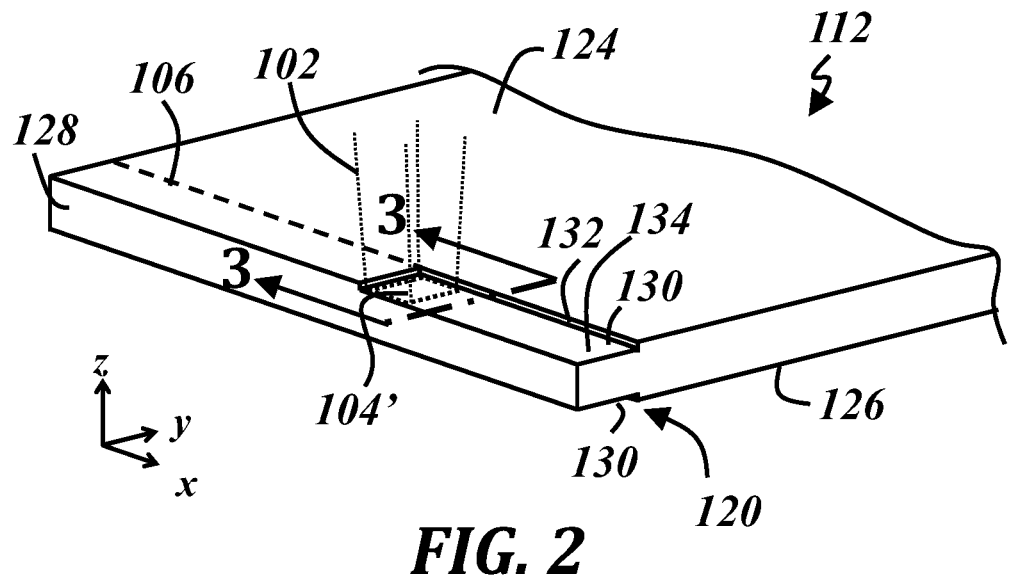
FIG. 2 is a perspective view of an edge region of an exemplary sheet metal piece, including weld notches on opposite sides of the sheet metal piece formed by laser ablation.

Referring to FIG. 2, there is shown an exemplary sheet metal piece 112 that may be used to form a welded blank assembly while avoiding unwanted constituents in the resulting weld joint. The sheet metal piece 112 is shown during a laser ablation process and may be subsequently welded to an adjacent piece along an edge region 120. The sheet metal piece 112 includes opposite first and second sides 124, 126, and the edge region 120 includes an edge 128 that is to be welded. The particular edge region 120 shown in FIG. 2 includes two weld notches 130, where the two weld notches extend along the edge region on opposite sides 124, 126 of the sheet metal piece. The weld notch 130 on the visible side 124 is shown as it is being formed. Each weld notch 130 is defined by a first notch surface 132 and a second notch surface 134 that intersect or join each other. Though shown with generally perpendicular first and second notch surfaces 132, 134 along a single, straight edge region 120, the weld notches may be configured in numerous ways. For example, a weld notch can: include one or more off-axis or offset notch surfaces, have a uniform or non-uniform depth and/or width, differ from other weld notches located on the same sheet metal piece in terms of size, shape, configuration, etc., or be part of an edge region located along a straight edge, multiple straight edges, a curved edge, multiple curved edges, or some other part of the sheet metal piece, to cite several possibilities.

In the illustrated laser ablation process, a laser beam 102 is directed at the edge region 120 from a laser source (not shown) in order to form the weld notch 130. Energy provided by the laser beam 102 is transferred to the sheet metal piece 112 in the form of thermal energy at an ablation site or laser spot 104, melting and/or vaporizing material at the ablation site in order to remove material from one or more layers of the sheet metal piece. The laser beam 102 follows a path 106 along the edge region 120 to form the weld notch 130 in the desired configuration. For sheet metal pieces that include base, intermediate, and coating material layers as described below, the weld notch 130 may be formed by removing all or some of the coating material layer, all or some of the intermediate material layer, and/or some of the base material layer along the edge region 120. The sheet metal piece 112 may be held stationary while the laser beam 102 moves along the path 106 (in the x-axis direction in FIG. 2). Alternatively, the sheet metal piece 112 can be moved or indexed while the laser beam 102 remains stationary, or both the laser beam 102 and the sheet metal piece 112 can be moved so that the laser beam follows the desired path. Some portions of the path 106 can be straight or rectilinear, as shown in FIG. 2, while other portions can be contoured, curved or curvilinear; it is not necessary for the weld notch 130 to follow a straight path 106, as paths having other configurations can be followed instead. Any of the above-mentioned embodiments may be carried out while the sheet metal piece is in a horizontal, vertical or angled orientation.

Any suitable laser or other comparable light emitting device may be used to form the weld notches, and may do so using a variety of operating or equipment parameters. In one example, the laser source is a Q-switched laser, but other continuous wave and pulsed laser types may be used instead, such as various nanosecond, femtosecond and picosecond pulsed lasers. The illustrated laser spot 104 is rectangular, but the laser spot or footprint 104 can be any shape, such as round, square, elliptical, or any other suitable shape. Non-limiting examples of selectable or adjustable operating parameters for the laser source may include: laser power, pulse frequency, pulse width, pulse energy, pulse power, duty cycle, spot area, the overlap between successive laser pulses, and the speed of laser source relative to the sheet metal piece 112, to cite a few possibilities. Any combination of these operating parameters may be selected and controlled based on the particular needs of the application.

The laser ablation process can be performed in any number of different ways depending on the desired number, location and/or shape of the weld notches or other factors. For example, a second laser beam may be employed to overlap the laser beam 102 or to simultaneously remove material from a different portion of the sheet metal piece, such as the opposite side 126 or the actual edge surface 128; the laser beam may form a non-zero angle of incidence with the sheet metal piece; the sheet metal piece may be oriented at an inclined angle to help control the flow of molten expulsed material; the laser beam may be directed at an upward- or downward-facing side of the sheet metal piece; or the process may be performed on sheet metal that is continuously fed through the process from a roll, to cite several possibilities. In addition, processes other than laser ablation may be used to form the weld notch 130, such as a mechanical ablasion process that uses a scraper tool, a wire brush, or other tool to selectively remove material from the edge region 120.

Figure 3:
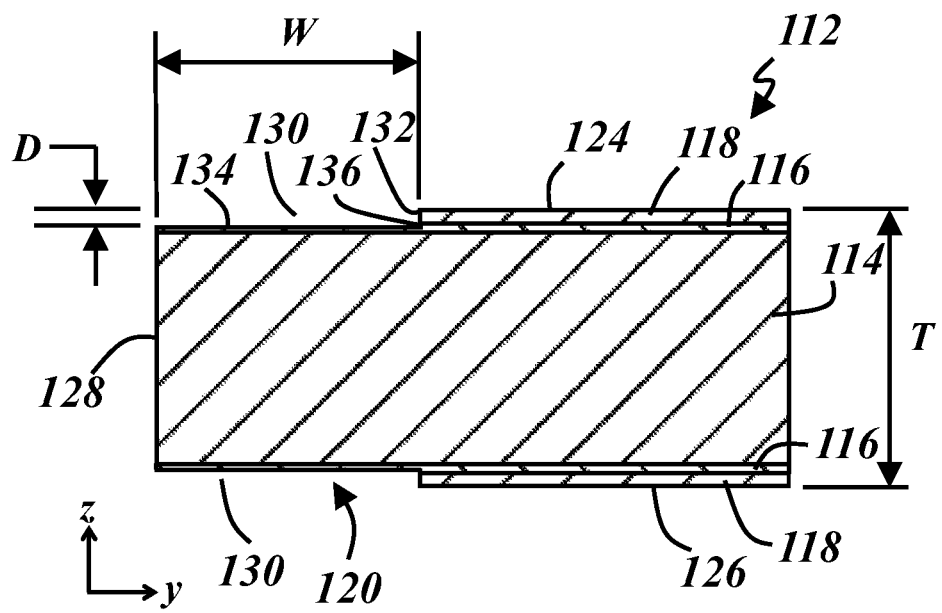
FIG. 3 is a cross-sectional view of a portion of the sheet metal piece of FIG. 2.

FIG. 3 is a cross-section showing the edge region 120 of the sheet metal piece 112 from FIG. 2. The illustrated sheet metal piece 112 includes multiple material layers, including the base material layer 114, intermediate material layers 116, and coating material layers 118. In this embodiment, the base material layer 114 is the central or core material layer (e.g., a steel core) and is sandwiched between the intermediate material layers 116 and the coating material layers 118. The base material layer 114 makes up the majority of the thickness T of the sheet metal piece 112 and thus may contribute significantly to the mechanical properties of the sheet metal piece. The coating material layers 118 are located over opposite surfaces of the base material layer 114 and are the outermost layers of the sheet metal piece 112. Each coating material layer 118 is relatively thin with respect to the base material layer 114 and may be selected to enhance one or more characteristics of the sheet metal piece (e.g., corrosion resistance, hardness, weight, formability, appearance, etc.). The coating material layer 118 may also be selected for use or compatibility with subsequent processes, such as heat treatment or interdiffusion processes, for example.

Each intermediate material layer 116 is located between the base layer 114 and one of the coating material layers 118, and is in contact with each in this embodiment. In one embodiment, the intermediate material layer 116 includes at least one constituent in common with each of the immediately adjacent layers 114, 118, such as an atomic element or chemical compound. The intermediate material layer 116 may be a reaction product of the base and coating material layers 114, 118. For example, a dip coating process, in which the base material layer is immersed or passes through a molten bath of the coating layer material, can result in a chemical reaction at the interface of the base material layer and the molten bath, and the reaction product is the intermediate material layer 116. In one specific example of such a dip coating process, the base material layer 114 is made of a high-strength or hardenable steel alloy and the coating material layer 118 is an aluminum alloy. The molten bath of aluminum alloy reacts with the base material layer at its surface to form the intermediate material layer 116, which includes iron-aluminum ($Fe_xAl_y$) intermetallic compounds such as $Fe_2Al_5$. The intermediate material layer 116 can have a higher content of the base material layer constituent (e.g., iron) closer to the base material layer 114, and a higher content of the coating material layer constituent (e.g., aluminum) closer to the coating material layer 118. Though shown in FIG. 3 as a perfectly planar layer with a constant thickness, the intermediate material layer 116 may be more irregular along its opposite surfaces than is illustrated here. The sheet metal piece 112 may include other, additional material layers as well, and is not limited to the particular arrangement described here.

One specific example of a multi-layered sheet metal piece, such as that shown in FIG. 3, useful for forming body and structural components in the automotive and other industries is a coated steel product in which the base material layer 114 is made from steel in any of its various possible compositions. In one particular embodiment, the base material layer 114 is a high-strength or hardenable steel alloy such as a boron steel alloy, dual phase steel, press hardened steel (PHS) or a high-strength low-alloy (HSLA) steel. Such materials, while strong for their weight, often require heat treating processes to attain the high-strength properties and/or can only be formed at high temperatures. The coating material layer 118 may be selected to help prevent oxidation during heat treatment, to be lighter in weight than the base material layer 114, and/or to interdiffuse with the other layers of the sheet metal piece 112 during subsequent heat treatment. In one embodiment, the coating material layer 118 is an aluminum alloy, such as an Al-silicone (Al—Si) alloy. Other possible compositions for coating material layer 118 include pure aluminum or zinc and its alloys or compounds (e.g., where the underlying material is galvanized). Where the base material layer 114 is steel and the coating material layer 118 comprises aluminum, the intermediate material layer 116 may include iron and aluminum in the form of intermetallic compounds such as $FeAl$, $FeAl_2$, $Fe_3Al$ or $Fe_2Al_5$ or various combinations thereof. The intermediate material layer 116 may also include an alloy of constituents from adjacent layers.

Exemplary material layer thicknesses range from about 0.5 mm to about 2.0 mm for the base material layer 114, from about 1 μm to about 15 μm for the intermediate layer 116, and from about 5 μm to about 100 μm for the coating material layer 118. In another example, material layer thicknesses range from about 0.5 mm to about 1.0 mm for the base material layer 114, from about 5 μm to about 10 μm for the intermediate layer 116, and from about 15 μm to about 50 μm for the coating material layer 118. In one embodiment, the combined thickness of the intermediate and coating material layers 116, 118 is in a range from about 15 μm to about 25 μm, and the intermediate material layer is about 20-30% of the combined thickness. For instance, the combined thickness of layers 116, 118 may be about 20 μm, where the intermediate material layer is about 4-6 μm thick, and the coating material layer makes up the remainder of the combined thickness. Of course, these ranges are non-limiting, as individual layer thicknesses depend on several factors specific to the application and/or the types of materials employed. For example, the base material layer 114 can be a material other than steel, such as alloys of aluminum, magnesium, titanium, or some other suitable materials. The method described herein may be used with sheet metal pieces having more or less material layers than shown in the figures. Skilled artisans will also appreciate that the figures are not necessarily to scale and that the relative thicknesses of layers 114-118 may differ from those illustrated in the drawings.

Referring again to FIG. 3, the weld notch 130 on the first side 124 of the sheet metal piece will be described. This description applies to the weld notch 130 on the opposite second side 126 as well, in this example. The weld notch 130 is a portion of the edge region 120 of the sheet metal piece 112 where some material has been removed or omitted from the otherwise uniform layered structure. The weld notch 130 promotes a high quality weld joint along edge 128 when the sheet metal piece is welded to another piece, and may do so via a configuration that reduces or eliminates the amount of the coating material layer 118 and/or the intermediate material layer 116 that becomes part of a subsequent weld joint. The weld notch is particularly useful where the coating material layer 118 includes one or more constituents that form discontinuities in or would otherwise weaken the resulting weld joint if included therein. The weld notch 130 has a characteristic notch width W and notch depth D, each being relatively constant along the length of edge 128 in this particular embodiment. The notch width W is the distance from edge 128 to the first notch surface 132, and the notch depth D is the distance from the outer surface of the coating material layer 118 to the second notch surface 134. Where the weld notch 130 is square with the sheet metal piece, as shown in this particular example, the notch width W is equal to the width of the second notch surface 134, and the notch depth D is equal to the width of the first notch surface 132.

The dimensions of the weld notch 130 may be related to the thickness T of the sheet metal piece, to the intended size of the weld joint to be formed at edge 128, and/or to one or more material layer thicknesses. In one embodiment, the notch width W is in a range from about 0.5 to about 1.5 times the thickness T. In another embodiment, the notch width W is in a range from about 0.5 mm to about 4 mm. The notch width W may also be at least one half of the width of the intended weld joint. The notch depth D for the example shown in FIG. 3 is greater than the thickness of the coating material layer 118 and less than the combined thickness of the intermediate and coating material layers 116, 118. But this differs in some of the other exemplary embodiments.

The weld notch 130 can also be described with relation to certain characteristics of the notch surfaces 132, 134. For example, in the embodiment of FIG. 3, the first notch surface 132 includes material from both the intermediate material layer 116 and the coating material layer 118. The second notch surface 134 includes material from the intermediate material layer 116 only, and the first and second notch surfaces intersect along an edge 136 that is positioned or located in the intermediate material layer. Thus, in this particular example, the weld notch 130 is formed in the sheet metal piece 112 by removing the entire coating material layer 118 and a portion of the intermediate material layer 116 along edge region 120. In other examples, the weld notch may be formed by removing only a portion of the coating material layer 118, or by removing the entire coating and intermediate material layers 118, 116 and a portion of the base material layer 114. Each of the notch surfaces 132, 134 may also include striations, witness lines, or other indicators of the type of process used to remove material at the weld notch location. Ablation processes such as laser ablation or mechanical ablation can form notch surfaces with different surface characteristics, and the welded blank assemblies described herein may use sheet metal pieces with a variety of different weld notches.

Figure 4:
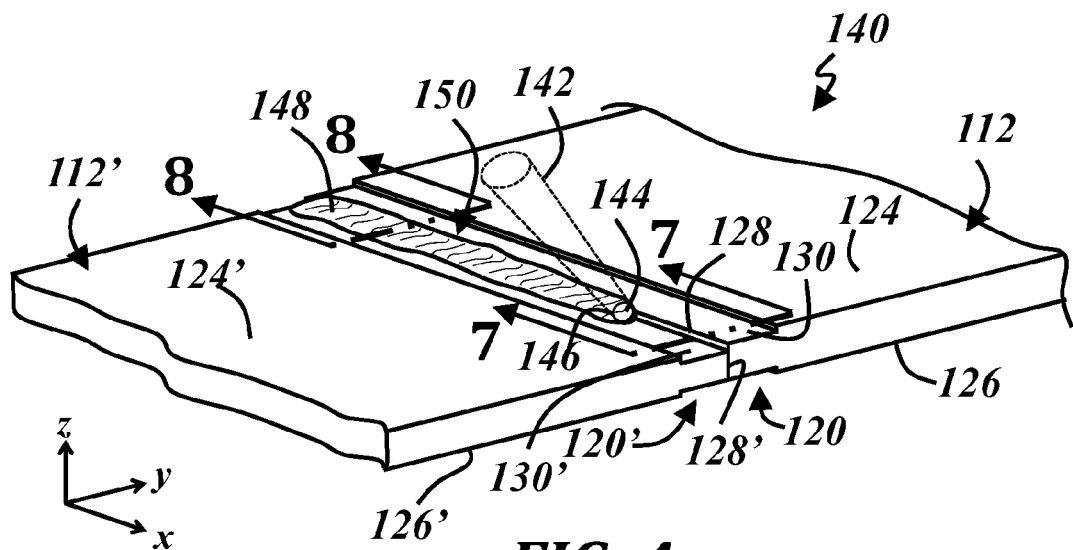
FIG. 4 is a perspective view of an exemplary welding process being performed on aligned sheet metal pieces with weld notches in order to form a welded blank assembly.

Referring now to FIG. 4, there is shown an exemplary welding process for forming a welded blank assembly 140 from two coated sheet metal pieces 112, 112'. For simplicity in the following description, the prime designation in the numerals will sometimes be omitted when referring generally to certain features that both sheet metal pieces include, and it will be used when referring to features of a specific one of the sheet metal pieces. In the illustrated process, the edge regions 120 of the two sheet metal pieces 112 are aligned with respective edges 128 contacting one another. A high-powered laser beam 142 is directed toward the aligned edge regions 120 and impinges the sheet metal pieces 112 at a laser spot 144. The laser beam 142 delivers energy to the laser spot 144 that is sufficient to locally melt material from each of the sheet metal pieces 112, thereby forming a weld pool 146 that includes molten material from both sheet metal pieces. As the laser beam 142 moves forward or advances along the aligned edge regions 120 (in the positive x-direction in FIG. 4), the portion of the weld pool 146 behind the laser beam (in the negative x-direction) solidifies to form a weld joint 148. The resulting weld joint 148 joins the two sheet metal pieces 112 and is located in a weld region 150 of the welded blank assembly 140.

The weld joint 148 may be substantially free of material from at least one of the coating material layer(s) 116, 118. This is due at least in part to the weld notches 130 being provided along the edge regions 120, where material from the coating layer(s) has been removed. In this particular example, each of the illustrated sheet metal pieces 112 has a different thickness (i.e., a tailor welded blank) and is prepared, as in FIGS. 2 and 3, with weld notches 130 formed along opposite sides 124, 126 of the respective edge region 120. This and other examples of welded blank assemblies are subsequently described in greater detail. It is also noted that, although the illustrated welded blank assembly 140 includes a single weld joint 148, the welded blank assembly may be formed from more than two sheet metal pieces 112 with more than one weld joint 148. The blank assembly 140 may alternatively or additionally include one or more curvilinear weld joints, in which at least a portion of the weld joint is curve-shaped and formed along curved or contoured edges 128 and/or edge regions 120.

Figure 5:
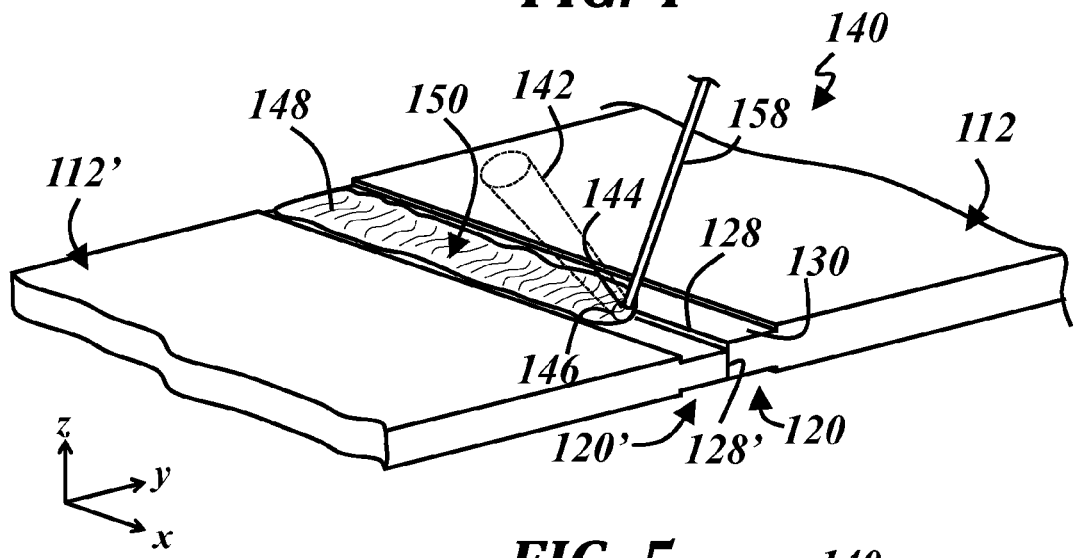
FIG. 5 is a perspective view of another exemplary welding process being performed on aligned sheet metal pieces with weld notches, where additional material is added to the weld joint in the form of a wire.

Other process steps may be performed to improve the quality of the resulting weld joint 148, such as by providing additional material to the weld pool 146 in order to control the composition, size and/or shape of the resulting weld joint 148. FIG. 5 shows one example, where the additional material is in the form of a metal wire 158 that is fed toward the laser spot 144 as the laser beam moves along the aligned edge regions 120. The material from the metal wire 158 melts along with material from the sheet metal pieces 112 so that the weld pool 146 and the resulting weld joint 148 include the additional material. This can have the effect of diluting the weld pool 146 with respect to certain unwanted constituents (i.e., residual constituents that were not completely removed from the coating and intermediate layers 118, 116). For example, it is sometimes the case that residual coating material is present at the aligned edge regions 120 even after an ablation process forms the weld notches 130. This may be due to splatter from the laser ablation process or coating material that has been smeared or wiped along edges 128 during previous shearing operations. Unwanted constituents may also include oxides or other corrosion products present along the edge regions. Diluting the weld pool 146 with desirable additional material can help drive out any residual unwanted constituents, which may be less soluble in the weld pool.

Figure 6:
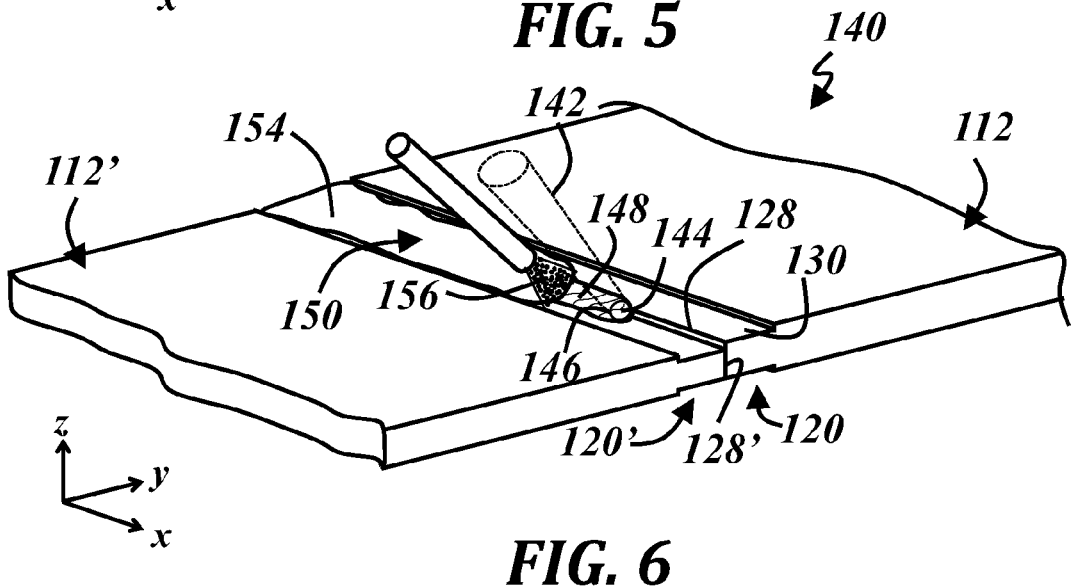
FIG. 6 is a perspective view of another exemplary welding process being performed on aligned sheet metal pieces with weld notches, where additional material is added to the weld joint in the form of a powder.

The welding process may also include the addition of a protective coating 154 or other additional material over the resulting weld joint 148, as shown in FIG. 6. The protective coating 154 may be applied to protect the weld region 150 from oxidation while the blank assembly 140 awaits metal-forming or other subsequent processes. The protective coating 154 can be a corrosion-resistant material, such as a corrosion-resistant metal or an organic material (e.g., oil, wax, or polymer-based). The coating 154 may be applied in solid or liquid form, depending on the composition. In the example of FIG. 6, the material that forms the coating 154 is applied as a powder material 156 just behind the laser spot 144, where residual heat from the laser process melts the powder material so that it flows and coats the weld joint 148 and/or other portions of the weld region 150. A secondary heating process, such as an additional laser beam or other heat source, may be employed to help the coating material flow in the weld region. The protective coating may have one or more constituents in common with the coating material layer 118 of the sheet metal piece(s). In one embodiment, the protective coating 154 is aluminum or an Al-alloy and may be formulated to replace material previously removed from the individual sheet metal pieces 112 when the weld notches 130 were formed. In the case where the sheet metal pieces 112 are Al-coated steel, the protective coating 154 is thus available to interdiffuse with the steel in the weld region in subsequent heat treating and/or hot-forming processes. Where organic materials are used to form the protective coating 154, the coating can be burned off in such subsequent processes, or otherwise later removed.

The additional material, whether provided in wire form, powder form or otherwise, is preferably selected to be compatible with the materials already included in the weld pool. For example, the metal wire 158 may be made from the same material as the base material layer 114 of the sheet metal pieces 112. Or the additional material may be an alloy of constituents, some or all of which are also present in the base material layer of the sheet metal pieces. Where the sheet metal pieces are coated steel sheets, the additional material 152 may be steel or another Fe-alloy. In another embodiment, the additional material is selected so that the final weld joint composition has a higher resistance to corrosion or oxidation than does the base material layer of the sheet metal pieces. It is not necessary for the additional material to be provided in wire form, as the additional material could just as easily be provided in the form of a metallic powder (FIG. 6) that is sprayed or is otherwise provided to the molten weld pool, for example.

In addition to diluting unwanted constituents, the introduction of additional material can affect the weld joint composition in other ways. For example, the additional material can be selected to enhance the strength or hardness of the weld joint 148. In one embodiment, the base material layers 116 are steel alloys, and carbon powder is added to the weld pool 146. Carbon can increase the hardness of the weld joint 148 in this case, even when added in very small amounts (e.g., 0.25 wt % or less). Other materials that may be added to the weld pool 146 to enhance the strength of the formed weld joint 148 include steel, iron, boron, chromium, magnesium, manganese, molybdenum, tin, titanium, vanadium or any alloy and/or combination thereof Other added materials may be suitable, including flux-core and solid-core wires, depending on the composition of the base material layer, the desired property enhancement, or on other factors. Preferably, such materials are added in an amount that causes the weld joint to have a hardness and/or a tensile strength that is greater than that of the sheet metal pieces at locations away from the weld joint, even after subsequent heat treating processes.

For example, when the welded blank assembly undergoes subsequent heat treating processes without the added material, the composition and the microstructure of the weld joint and of the base material layer can become nearly identical, so that the weld joint is the weakest portion of the welded blank assembly due to surface irregularities and reduced thickness. In the specific case of steel alloys, the weld joint as initially formed may be harder and stronger than the base material layer away from the weld joint; but subsequent heat treatments, such as hot-stamping and hot-forming operations, can austenize the weld joint or otherwise make the steel microstructure throughout the welded blank assembly more uniform. In a non-limiting example of a heat treatment cycle for boron steel, the welded blank assembly may first be heated to an Austenizing temperature, typically around 790 C to 915 C, and then quickly quenched to form a Martensite grain structure throughout the whole part; tailored heating and cooling can also be used to effect the formation of the Martensite grains. This is, of course, only one example of a heat treatment that may be used with the present welded blank assembly, as others are certainly possible. The terms "heat treatment" and "heat treating," as used herein, broadly include any type of high temperature process (e.g., hot stamping) that is known in the art to be useful with high-strength or hardenable steel alloys, such as boron steel and HSLA steel.

Figure 8:
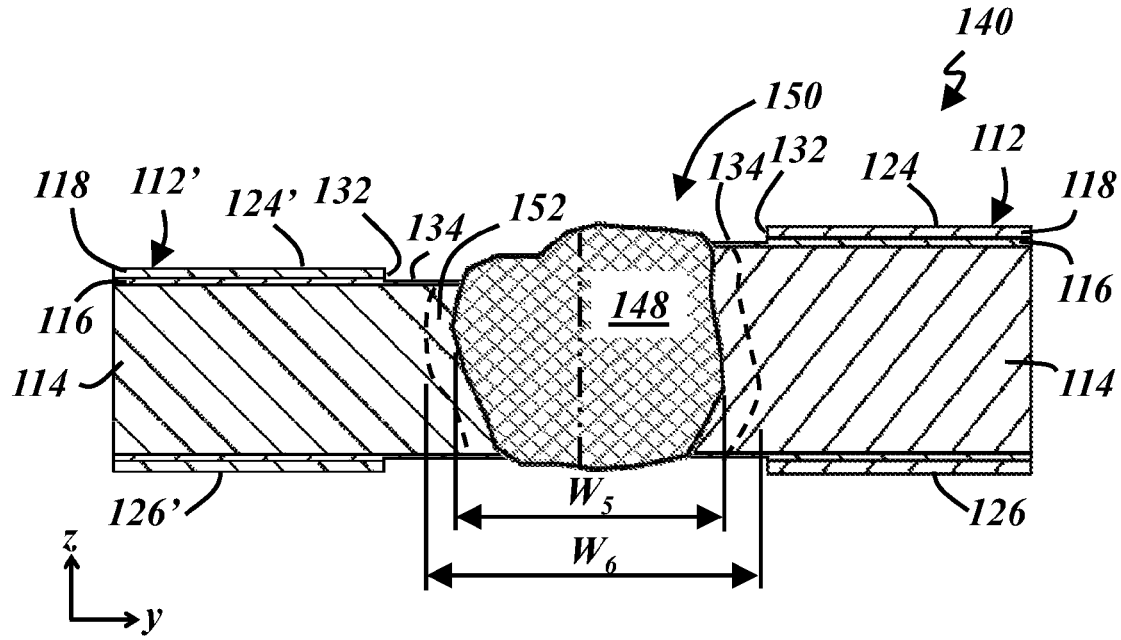
FIG. 8 is a cross-sectional view of the welded blank assembly of FIG. 4 taken after laser welding.
Figure 9:
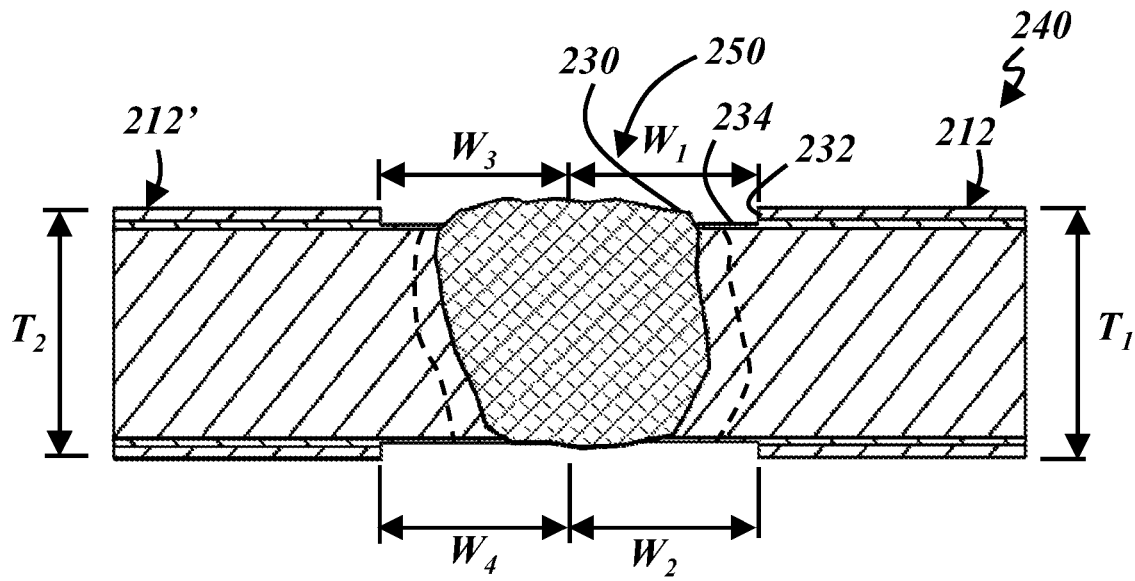
FIG. 9 is a cross-sectional view of an embodiment of the welded blank assembly, where the welded sheet metal pieces have the same thickness.
Figure 10:
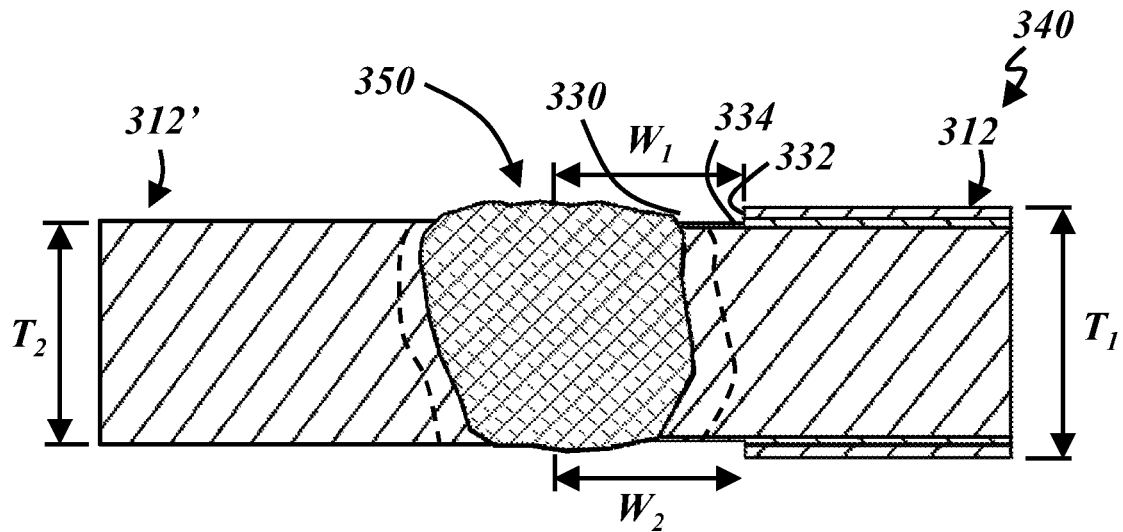
FIG. 10 is a cross-sectional view of an embodiment of the welded blank assembly, where only one of the welded sheet metal pieces has weld notches.

It is also possible to use the additional material to control the size of the resulting weld joint 148, as this may be particularly useful considering that material removed from the weld notches may need to be replaced in order to achieve a desired strength across the weld joint. The weld notches may be further filled-in with the additional material during the process, as shown in FIGS. 5 and 6 where more of the weld notch volume is filled in than in FIG. 4 where no additional material is added. In one embodiment, the volumetric amount of additional material per unit length that is added back to the weld joint 148 is equal to or greater than the volumetric amount of material per unit length that was removed from the edge region 120 prior to welding during the formation of one or both of the weld notches 130. The additional material may result in added thickness at the weld joint—e.g., the thickness of the weld joint can be greater than or equal to at least one of the thicknesses $T_1, T_2$ of the adjacent sheet metal pieces so that a portion of the weld joint extends beyond at least one of the adjacent surfaces of the sheet metal pieces. This may occur, for example, at upper side 124, lower side 126, or both, as illustrated in FIGS. 8-10.

The additional material may also be used to control the shape or geometry of the resulting weld joint 148, as mentioned above. For instance, tailor welded blanks can sometimes exhibit weld joints that are concave in shape on the upper side where they are laser welded (i.e., side 124, 124' in the drawings). This is usually because gravity pulls the molten weld material downwards during the laser welding process so that the resulting weld joint 148 is slightly concave or indented on the upper surface. The introduction of additional material, particularly when provided from wire 158, can be used to influence or control this shape so that both sides of the weld joint 148 exhibit an outwardly extending or convex weld joint shape, as shown in FIGS. 8-10. Controlling the shape of the weld joint 148 and building it up in the thickness direction is different than simply adding filler material to fill in gaps or spaces between the edge surfaces 128, 128', as is sometimes done during certain non-laser welding operations. It should be appreciated that additional material, whether it be provided in wire, powder or some other suitable form, may be used to manipulate the weld joint 148 and provide it with a shape, other than the convex shape illustrated in the drawings.

The embodiment of FIG. 5, where additional material is provided to the weld pool 146 in the form of a wire or rod 158, is particularly well suited for influencing the composition, size and/or shape of the resultant weld joint 148. If the wire 158 is used to influence the size and/or shape of the weld joint 148, it is usually helpful to introduce the wire of additional material on the side of the welded assembly where the laser 142 impinges or strikes the work piece. In FIG. 5, this also happens to be the upper side of the welded assembly so that as molten material in the weld pool 146 is pulled down by gravity, it is replenished and then some by the introduction of the additional material from wire 158. The FIG. 6 embodiment, which depicts an example of providing additional material to the weld pool 146 in the form of powder as opposed to wire, is well suited for controlling the composition of the resultant weld joint 148. As explained above, it sometimes takes only a small amount of a strengthening agent like carbon (C) to make the weld joint 148 considerably stronger; thus, the powder introduction technique may be best for instances where it is desired to influence the composition, but not necessarily the size and/or shape of the weld joint. That is not to say, however, that the powder introduction method of FIG. 6 could not be used to control the size and/or shape of the weld joint, only that it is well suited for controlling its composition or makeup.

In those examples where a fiber laser or other high energy density laser is used to form the weld joint 148, the additional material may be introduced to the weld pool 146 by inserting it or otherwise providing it down into a keyhole weld. This can create better uniformity of the weld joint composition, as the additional material does not necessarily concentrate at the surface where it is introduced. For uneven gauge welded blank assemblies (like those shown in FIGS. 7 and 8), controlling the size and/or shape of the weld joint 148 with additional material may not be as significant, because material from the thicker sheet metal piece 112 may be used at the weld pool 146 to address a concavity or thinning of the weld joint 148. For even gauge welded blank assemblies (like those shown in FIGS. 9 and 10), controlling the size and/or shape of the weld joint 148 with additional material may be more significant, because there is no excess material from a thicker sheet metal piece at the weld pool 146 that can be used to manipulate the size and/or shape of the weld joint 148. In these instances, it may be preferable to provide the additional material from a wire or rod, as they are sometimes better suited to controlling the shape and/or size of the weld joint 148, as explained above.

Figure 7:
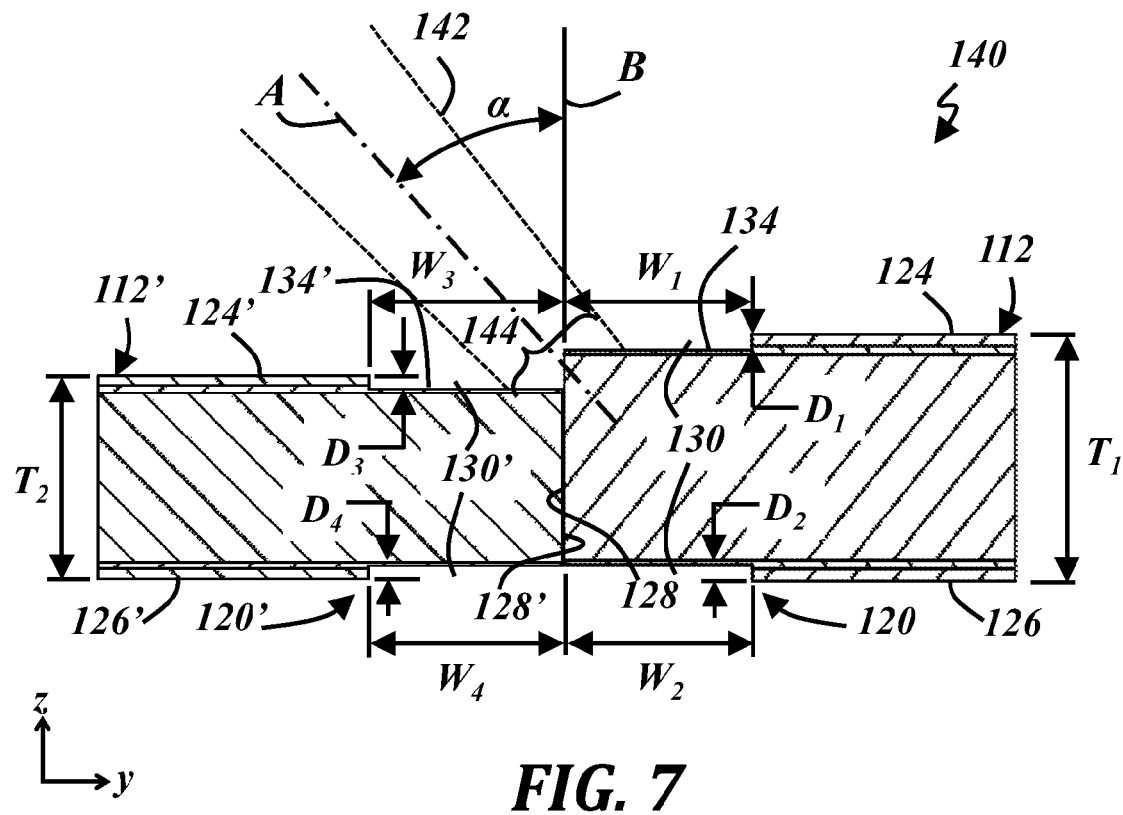
FIG. 7 is a cross-sectional view of the welded blank assembly of FIG. 4 taken before laser welding.

FIGS. 7 and 8 are cross-sectional views of the welded blank assembly 140 from FIG. 4, respectively taken before or ahead of the laser beam 142 and after or behind the laser beam as it moves in the x-direction. Certain dimensional relationships may be described with reference to these figures. FIG. 7 shows the edge regions 120 of the two sheet metal pieces 112, 112' with respective edges 128 butted against one another, where one sheet metal piece 112 has a thickness $T_1$ and the other sheet metal piece 112' has a smaller thickness $T_2$. FIG. 7 also shows the laser beam 142, complete with a central axis A that forms an angle a with a line B that is normal to the plane of the sheet metal pieces 112. The first sheet metal piece 112 includes weld notches 130 on opposite sides 124, 126 of the edge region 120 with respective widths $W_1$ and $W_2$ The second sheet metal piece 112' includes weld notches 130' on opposite sides 124', 126' of the edge region 120' with respective widths $W_3$ and $W_4$. Each weld notch 130, 130' has a corresponding depth $D_1$–$D_4$, as well.

FIG. 8 shows the two sheet metal pieces 112, 112' joined at the weld joint 148 to form the welded blank assembly 140. The sheet thicknesses ($T_1$, $T_2$), the weld notch widths ($W_1$–$W_4$), and the weld notch depths ($D_1$–$D_4$) are omitted in FIG. 8 for clarity, but may be the same as in FIG. 7. The welded blank assembly 140 has a weld region 150 that includes the weld joint 148, a heat-affected zone 152, and one or more weld notch surfaces 132, 132', 134, 134' (optional) along one or both sides of the weld joint 148. The weld joint 148 includes material from both of the sheet metal pieces 112, 112', as well as any additional material that may have been added, and has a width $W_5$. The weld joint 148 may be formed from material that was molten and part of the weld pool 146 during the welding process. A mixture of material from the base material layers 114, 114' of each sheet metal piece 112, 112' is preferably the major constituent of the weld joint 148. The weld joint 148 is substantially free from material from the coating material layers 118, 118'; "substantially free," as used herein, means that material from the coating material layers 118, 118' makes up less than 0.5 wt % of the weld joint composition, and in some cases less than 0.1 wt %. Depending on the size and shape of the weld notches 130, 130', as well as other factors like the thickness of the various material layers, the weld joint 148 may or may not be substantially free from material from the intermediate material layers 116, 116'. In the event that the weld joint 148 is substantially free of such material, the total amount of material from the intermediate material layers 116, 116' is less than 0.5 wt % of the weld joint composition. This is not necessary, however, as the weld joint 148 may be substantially free of coating layer material, but include intermediate layer material.

The heat-affected zone 152 may be created during the laser welding process and is located adjacent to the weld joint 148. The boundaries of the exemplary heat-affected zone 152 are illustrated in dashed lines, however, these boundaries may differ in other embodiments. The composition of the heat-affected zone 152 is generally the same as the base material layer 114, 114' from which it is derived. But the heat-affected zone 152 is characterized by having at least a somewhat different microstructure than that of the base material layer 114, due to the material having reached a transformation temperature during the welding process. The microstructure in the heat-affected zone 152 can be different from that of the base material layer 114 in several ways, such as average grain size, grain composition, relative amounts of certain solid solution phases and/or precipitate phases, crystalline structure (e.g., ferrite versus austenite), etc. In other words, the thermal energy from the laser beam 142 causes the material in the heat-affected zone 152 to be heat-treated during the welding process. Together, the weld joint 48 and the heat-affected zone 152 have a width $W_6$ In the example shown in FIGS. 7 and 8, the thickness $T_1$ of sheet metal piece 112 is greater than the thickness $T_2$ of sheet metal piece 112' (i.e., an uneven gauge tailor welded blank), although this is not mandatory. A welded blank assembly 140 with thick and thin portions is useful for subsequent forming of components in which higher strength is required at one portion than at another. Thus, thicker metal may be used only where needed. Side 126 of the first sheet metal piece 112 is aligned generally in the same plane with side 126' of the other piece 112' in the welding set-up. The mismatch in sheet thickness causes a step portion so that the edge 128 of the thicker sheet metal piece 112 is exposed where it butts against opposing edge 128'. In the illustrated example, the angle of incidence of laser beam 142 is greater than zero ($\alpha > 0°$) so that the laser beam impinges a portion of edge 128 along with weld notch surfaces 134, 134' during the welding process. The angle of incidence a and the exact location of the laser spot 144 may vary depending on several factors, such as the actual thicknesses $T_1$ and $T_2$ and/or the degree of difference between them. For example angle $\alpha$ may be larger with an increased thickness differential ($T_1$–$T_2$) or smaller with decreased thickness difference. In one example angle $\alpha = 0°$ when $T_1 = T_2$, and angle a is between 0° and 45°, or even between 5° and 35°, when $T_1 \ne T_2$.

Each weld notch 130, 130' may be sized individually to ensure that material from the coating material layers 118, 118' is not present or is substantially free from the resulting weld joint 148. For the sheet metal piece 112, the weld notch dimensions may be correlated to: the overall thickness $T_1$ of the sheet metal piece 112, the relative thicknesses of the two sheet metal pieces (e.g., $T_1$–$T_2$ or $T_1/T_2$), the thickness of one or more of the material layers 116, 118, the intended size $W_5$ of the weld joint 148, the intended size $W_6$ of the heat-affected zone 152, the size of the laser spot 144, and/or the angle of incidence $\alpha$, to cite several non-limiting possibilities.

In the example where the weld notch dimensions are correlated to the overall thicknesses of the sheet metal pieces, each weld notch 130, 130' may have a width $W_1$, $W_2$, $W_3$, $W_4$ that is in a range from about 1.0 to about 2.0 times the thickness $T_1$, $T_2$ of the sheet metal piece in which it is formed. To illustrate this feature, consider the example where $T_1$ is 2.0 mm and $T_2$ is 1.0 mm, which results in weld notch dimensions $W_1$ and $W_2$ that are in a range from about 2.0 to 4.0 mm, and $W_3$ and $W_4$ that are in a range from about 1.0 to 2.0 mm. It may be preferable for each weld notch width W to be near the middle of these ranges so that $W_1$ and $W_2$ are each about $1.5 T_1$, and $W_3$ and $W_4$ are each about $1.5 T_2$. The weld notch width on one side of a sheet metal piece may be different than that on the opposite side of the sheet metal piece. For instance, the weld notch widths $W_1$ and $W_3$ on the side of the sheet metal piece that is impinged or struck by laser beam 142 may be wider than the weld notch widths $W_2$ and $W_4$ on the opposite or non-laser side in order to accommodate the larger weld joint dimensions. In one embodiment, the ratios $W_1/W_2$ and $W_3/W_4$ are each in a range from about 1.0 to about 2.0.

In the example where the weld notch dimensions are correlated to the intended sizes of the weld joint and/or the heat-affected zone, the combined weld notch width ($W_1 + W_3$) on the laser welded side 124 of the welded blank assembly 140 is from about 2.0 to about 5.0 times the intended size $W_5$ of the weld joint 148 or from about 1.5 to about 4.0 times the intended size $W_6$ of the heat-affected zone 152. This can allow for sufficient space in the weld region 50 to help prevent melting and inclusion of material from the coating material layers 118, 118' during the welding process. If the weld notches 130, 130' are not properly sized, then the laser beam 142 could cause material from one or more coating or intermediate layers to undesirably flow into the weld pool, thus defeating the purpose of the weld notches. Particularly in instances where the coating material layer 118 has a lower melting point than the base material layer 114, it may be useful to provide weld notch dimensions that are large enough so that the remaining coating material is spaced sufficiently away from the weld joint 148 and the heat-affected zone 152. On the other hand, if the weld notch dimensions are too large, then an excessive amount of non-coated surface area may be exposed at the weld notch surface 134, 134' which can lead to undesirable corrosion, oxidation, etc. during subsequent heat treatments.

In the example where the weld notch dimensions are correlated to the size of the laser spot, the narrowest weld notch width $W_1$, $W_2$, $W_3$, $W_4$ may range from about 0.5 to about 2.0 times the width of the laser spot 144. Depending on the type of laser and the particular application in which it is being used, the laser spot 144 may have a width or diameter from about 0.5 mm to about 2.0 mm. Using an example where the width of the laser spot 144 is 1.0 mm and the narrowest or smallest weld notch width belongs to the weld notch 130' located on the underside 126' of the welded blank assembly, that weld notch may have a width of $W_4$ that is from about 0.5 mm to about 2.0 mm. This relationship can be used in reverse as well to determine suitable laser spot sizes having known weld notch widths, and vice-versa.

Experience has shown that the preceding relationships involving weld notch dimensions and one or more parameters—like the overall thickness of the sheet metal pieces or the intended size of the weld joint and/or heat-affected zone or the size of the laser spot—help ensure that the resulting weld joint will be substantially free of contaminants, and help avoid large and superfluous weld notch surface areas surrounding the weld joint. Such surface areas are not part of the weld joint and have had coating material layer 118 removed, thus, they can be more susceptible to corrosion, oxidation, etc.

FIGS. 9 and 10 illustrate additional embodiments of welded blank assemblies that may be formed by a welding process similar to that shown in FIG. 4. The welded blank assembly 240 of FIG. 9 includes sheet metal pieces 212, 212' that each has generally the same thickness, so that $T_1=T_2$ (i.e., an even gauge tailor welded blank). This configuration may be useful, for example, where it is desired to join two sheet metal pieces having different properties (e.g., different grades of steel so that one portion of the blank assembly is more formable and another portion is harder) or to join two sheet metal pieces made from the same stock material, but in a manner that saves material and reduces waste. In the illustrated embodiment, both of the sheet metal pieces 212, 212' are coated metal pieces and have weld notch surfaces 232, 234 in the weld zone 250. The dimensional relationships set forth above in relation to FIGS. 7 and 8 may apply here as well. Although $T_1=T_2$ in this example, $W_1$ is not necessarily equal to $W_3$, nor is $W_2$ necessarily equal to $W_4$, etc.

FIG. 10 illustrates an embodiment in which the welded blank assembly 340 includes a coated sheet metal piece 312 and an uncoated sheet metal piece 312', with or without the presence of additional material. The coated piece 312 has weld notches 330 formed along the edge region prior to welding so that the welded blank assembly 340 includes weld notch surfaces 332, 334 on one side of the weld zone 350, but not on the other side of the weld zone where the uncoated piece 312' is located. This configuration may be useful in situations where only one coated sheet metal piece is necessary or desired. The dimensional relationships set forth above in relation to FIGS. 7 and 8 apply here as well. Although $T_1$ is approximately equal to $T_2$ in this example, this is not always the case. For example, the coated sheet metal piece 312 may include a higher strength alloy as the base material layer 14 so that its thickness can be reduced compared to the uncoated sheet metal piece 312'.

Other types of welding processes may be used in place of the laser welding processes illustrated and described herein. For example, the laser beam may be replaced with conventional MIG or TIG, laser MIG or TIG, hybrid welding, or other arc welding equipment to form the weld joint. Though the inclusion of weld notches along edge regions of sheet metal pieces may be particularly suitable for use in laser welding processes, where the primary source of weld joint material is the sheet metal pieces themselves, weld notches can be used with other types of welding processes as well and may improve weld joint quality accordingly. In addition to the butt weld configurations shown in the figures, it is also possible to form lap welds or spot welds in which the edge regions of two different sheet metal pieces overlap. In applications where coated sheet metal pieces are used, the weld notches described herein may be formed along the edge(s) to be welded to ensure a high quality weld joint.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of making a welded blank assembly, comprising the steps of:
   (a) providing a first sheet metal piece having a thickness ($T_1$) and a second sheet metal piece having a thickness ($T_2$), wherein at least one of the first and second sheet metal pieces is a coated sheet metal piece and includes a base material layer, a coating material layer, and an intermediate material layer interposed between the base material layer and the coating material layer, the intermediate material layer includes an intermetallic compound having at least one constituent from each of the base material layer and the coating material layer, and the at least one sheet metal piece has an edge region with a weld notch where material from both the coating material layer and the intermediate material layer has been removed to expose the base material layer;

(b) arranging the first and second sheet metal pieces together at the edge region;

(c) forming a weld joint between the first and second sheet metal pieces at the edge region, wherein the weld joint is at least partially located in the weld notch and includes material from the edge region but is substantially free of material from both the coating material layer and the intermediate material layer, and the weld joint is formed from a weld pool that includes molten material from the exposed base material layer of the at least one sheet metal piece that solidifies with the other sheet metal piece; and (d) providing additional material to a weld region to form a protective coating once the weld joint is formed, wherein the protective coating covers at least a portion of the weld joint and the exposed base material layer within the weld notch, and the additional material includes a corrosion-resistant material that is provided to protect at least a portion of the weld region from oxidation during a subsequent heat treating and/or hot forming process so that the portion of the weld region has a higher resistance to corrosion than the base material layer.

2. The method of claim 1, wherein $T_1 > T_2$ and the thinner second sheet metal piece is a coated sheet metal piece with a weld notch where material from the coating material layer has been removed, and step (c) further comprises forming the weld joint so that molten material from the thicker first sheet metal piece flows into and solidifies in the weld notch of the thinner second sheet metal piece.

3. The method of claim 1, wherein $T_1 = T_2$ and both the first and second sheet metal pieces are coated sheet metal pieces with weld notches where material from a coating material layer has been removed, and step (c) further comprises forming the weld joint so that molten material from both the first and second sheet metal pieces flows into and solidifies in both weld notches of the first and second sheet metal pieces.

4. The method of claim 1, wherein the weld notch has a width in a range from 0.5 to 1.5 times the thickness ($T_1$, $T_2$) of the sheet metal piece in which it is formed.

5. The method of claim 1, wherein step (c) further comprises the steps of:
forming a weld pool between the first and second sheet metal pieces at the edge region that includes molten material from both the first and second sheet metal pieces; and
providing the additional material to the weld pool to influence the size, shape and/or composition of the weld joint once it is formed, wherein the additional material is designed to strengthen the weld joint during the subsequent heat treating process.

6. A method of making a welded blank assembly, comprising the steps of:

(a) providing first and second sheet metal pieces, wherein at least one of the first and second sheet metal pieces is a coated sheet metal piece and includes a base material layer, a coating material layer, and an intermediate material layer interposed between the base material layer and the coating material layer, the intermediate material layer includes an intermetallic compound having at least one constituent from each of the base material layer and the coating material layer, and the at least one sheet metal piece has an edge region with a weld notch where material from both the coating material layer and the intermediate material layer has been removed to expose the base material layer;

(b) arranging the first and second sheet metal pieces together at the edge region;

(c) using a laser to form a weld pool between the first and second sheet metal pieces at the edge region, wherein the weld pool includes material from the edge region but is substantially free of material from the both the coating material layer and the intermediate material layer, and the weld pool includes molten material from the exposed base material layer of the at least one sheet metal piece that solidifies with the other sheet metal piece; and (d) providing additional material to the weld pool to influence a size and/or shape of a weld joint once it is formed, wherein the additional material covers at least a portion of the weld pool and the exposed base material layer within the weld notch, and the additional material fills in the weld notch and increases a thickness of at least a portion of a weld region to greater than a thickness of the weld notch so that the portion of the weld region is strengthened for a subsequent heat treating and/or hot forming process.

7. The method of claim 6, wherein step (d) further comprises the additional material being provided to the weld pool in a manner that primarily increases the thickness of the portion of the weld region as opposed to filling in gaps between edges of the first and second sheet metal pieces, and the increased thickness strengthens the weld joint for the subsequent heat treating and/or hot forming process.

8. The method of claim 7, wherein step (d) further comprises providing the additional material to the weld pool in the form of a metal wire, and the metal wire is introduced on the same side of the welded blank assembly as the laser and near a laser spot so that the additional material increases the thickness of the weld joint as it melts into the weld pool.

9. The method of claim 6, wherein step (d) further comprises providing the additional material to the weld pool to influence the shape of the weld joint once it is formed, the additional material is provided to the weld pool in a manner that results in a generally convex shape of the weld joint as opposed to a concave shape, and the convex shape strengthens the weld joint for a subsequent heat treating process.

10. The method of claim 9, wherein step (d) further comprises providing the additional material to the weld pool in the form of a metal wire, and the metal wire is introduced on an upper side of the welded blank assembly and near a laser spot so that the additional material counteracts a concavity formed by gravity pulling down molten material of the weld pool and creates a weld joint with a convex upper surface.

11. The method of claim 6, wherein step (d) further comprises providing the additional material to the weld pool to influence the composition of the weld joint once it is formed, the additional material is provided to the weld pool in a manner that causes the additional material to intermix with molten contents of the weld pool and strengthens the weld joint for a subsequent heat treating process.

12. The method of claim 11, wherein step (d) further comprises providing the additional material to the weld pool in the form of a metal powder, and the metal powder is introduced at a keyhole weld formed by a high energy density laser so that the additional material is well dispersed within the weld joint.

13. The method of claim 11, wherein the additional material includes a major constituent of the coating material layer so that the additional material replaces at least some of the coating material that was previously removed at the weld notch.

14. The method of claim 6, wherein the additional material is carbon or a carbon-based alloy so that the composition of the formed weld joint has a higher carbon content than a base material layer of the first and second sheet metal pieces.

15. The method of claim 6, further comprising the step of:
(e) heat treating the welded blank assembly as part of a hot stamping process, wherein the welded blank assembly is heat treated in a manner that causes the weld joint with the additional material to have a generally consistent microstructure with the first and second sheet metal pieces once the hot stamping process is completed.

16. The method of claim 6, wherein step (c) further comprises using a laser to form a weld pool of molten material from the first and second sheet metal pieces and allowing the molten material to at least partially solidify; and step (d) further comprises providing the additional material to the at least partially solidified molten material to form a protective coating over the weld joint once it is formed.

17. A welded blank assembly, comprising:
a first sheet metal piece having a base material layer, a coating material layer, and an intermediate material layer interposed between the base material layer and the coating material layer, wherein the intermediate material layer includes an intermetallic compound having at least one constituent from each of the base material layer and the coating material layer, and the first sheet metal piece includes a first weld notch formed in both the coating material layer and the intermediate material layer along a first edge region to expose the base material layer;
a second sheet metal piece having a second edge region; and
a weld joint joining the first and second sheet metal pieces together along the first and second edge regions and being substantially free from constituents of the coating material layer and the intermediate material layer of the first sheet metal piece, wherein the weld joint is located within a weld region at least partially defined by a surface of the first weld notch, and the weld joint is formed from a weld pool that includes molten material from the exposed base material layer of the at least one sheet metal piece that solidifies with the other sheet metal piece; and
additional material forming a protective coating over at least a portion of the weld region, wherein the protective coating covers at least a portion of the weld joint and the exposed base material layer within the weld notch, and the additional material includes a corrosion-resistant material that is provided to protect the portion of the weld region from oxidation such that the portion of the weld region has a higher resistance to corrosion than the base material layer.

18. The method of claim 1, wherein step (d) further comprises applying the additional material in a powder form to the weld region after the weld joint is formed, and step (e) further comprises forming the protective coating by using a secondary heating process to melt the additional material powder.

19. The method of claim 1, wherein step (d) further comprises applying the additional material in a powder form to the weld region after the weld joint is formed, and step (e) further comprises forming the protective coating by using residual heat from the formation of the weld joint to melt the additional material powder.

20. The method of claim 1, wherein step (d) further comprises applying the additional material in a wire form to the weld region after the weld joint is formed, and step (e) further comprises forming the protective coating by using a secondary heating process to melt the additional material wire.

21. The method of claim 1, further comprising the step of:
(f) heat treating the welded blank assembly after the protective coating is formed, the protective coating at least partially protects the weld region from oxidation during the heat treating process.

22. The method of claim 1, wherein the additional material includes aluminum or an aluminum alloy.

23. The method of claim 1, wherein step (d) includes the additional material being in a powder form and including aluminum or an aluminum alloy, and the method further comprising the steps of:
(e) forming the protective coating after the additional material is applied, the protective coating is formed by using a laser to melt the additional material in the weld region; and
(f) hot stamping the welded blank assembly after the protective coating is formed, the protective coating at least partially protects the weld region from oxidation during the hot stamping process.

* * * * *